(12) United States Patent
Yokai et al.

(10) Patent No.: US 7,453,679 B2
(45) Date of Patent: Nov. 18, 2008

(54) APPARATUS AND METHOD FOR DRIVING INVERTER CIRCUIT

(75) Inventors: Masatoshi Yokai, Kariya (JP); Satoshi Yoshimura, Kariya (JP); Akira Ando, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/709,081

(22) Filed: Feb. 22, 2007

(65) Prior Publication Data
US 2007/0201176 A1   Aug. 30, 2007

(30) Foreign Application Priority Data
Feb. 27, 2006   (JP)   ............................... 2006-050187

(51) Int. Cl.
*H02H 5/04* (2006.01)
*H02H 9/08* (2006.01)
*H02H 7/00* (2006.01)

(52) U.S. Cl. ........................ 361/93.8; 361/103; 361/106
(58) Field of Classification Search ................. 361/93.8, 361/103, 106
See application file for complete search history.

(56) References Cited

U.S. PATENT DOCUMENTS
5,115,388 A * 5/1992 Shigekane ................ 363/56.03
5,923,135 A * 7/1999 Takeda ........................ 318/432

FOREIGN PATENT DOCUMENTS
JP   A-2001-169401   6/2001

\* cited by examiner

*Primary Examiner*—Stephen W Jackson
*Assistant Examiner*—Dharti H Patel
(74) *Attorney, Agent, or Firm*—Posz Law Group, PLC

(57) ABSTRACT

An inverter apparatus includes an inverter circuit, a temperature sensor, and a control circuit. The inverter circuit is driven by a PWM signal and includes switching elements that are divided in first and second groups. The temperature sensor detects a temperature of at least one of the switching elements of the first group. The control circuit controls a duty cycle of the PWM signal such that a first value of heat generated in the first group is equal to or greater than a second value of heat generated in the second group. The control circuit performs an overheat protection for protecting the inverter circuit from overheating when the detected temperature is equal to or greater than a threshold temperature.

20 Claims, 5 Drawing Sheets

APPARATUS AND METHOD FOR DRIVING INVERTER CIRCUIT

CROSS REFERENCE TO RELATED APPLICATION

This application is based on and incorporates herein by reference Japanese Patent Application No. 2006-50187 filed on Feb. 27, 2006.

FIELD OF THE INVENTION

The present invention relates to an apparatus and a method for driving an inverter circuit by a pulse-width modulated signal and for protecting the inverter circuit from overheating by using a reduced number of temperature sensors.

BACKGROUND OF THE INVENTION

An inverter circuit for converting direct current (DC) to alternating current (AC) includes multiple semiconductor switching elements. If the switching elements are heated beyond maximum rated temperatures, the switching elements are destroyed. Therefore, typically, an inverter apparatus for driving the inverter circuit detects temperatures of the switching elements and performs an overheat protection for protecting the switching elements from overheating, based on the detected temperatures.

For example, an inverter apparatus disclosed in JP-2001-169401A detects the temperatures of all the switching elements in the inverter circuit and controls output current of the inverter circuit based on the maximum temperature. The inverter apparatus needs many temperature sensors and a large space for the temperature sensors. Therefore, the size and manufacturing cost of the inverter apparatus are increased.

SUMMARY OF THE INVENTION

In view of the above-described problem, it is an object of the present invention to provide an apparatus and a method for driving an inverter circuit by a pulse-width modulated signal and for protecting all the switching elements of the inverter circuit from overheating based on a temperature of at least one of the switching elements.

An inverter apparatus includes an inverter circuit, a temperature sensor, and a control circuit. The inverter circuit is driven by a pulse-width modulated signal and includes multiple pairs of electrical switches. Each pair of the electrical switches has first and second switching elements connected in series between power and ground lines. Each first switching element forms a first group and each second switching element forms a second group.

The temperature sensor is included in the first group to detect a temperature of at least one of each first switching element.

The control circuit outputs the pulse-width modulated signal to the inverter circuit and controls a duty cycle of the pulse-width modulated signal such that a first value of heat generated in the first group is equal to or greater than a second value of heat generated in the second group. The control circuit performs an overheat protection for protecting the inverter circuit from overheating when the detected temperature is equal to or greater than a threshold temperature. Thus, all the first and second switching elements can be protected from overheating by detecting only the temperature of the first group, i.e., without detecting the temperature of the second group. Therefore, the number of temperature sensors can be reduced so that the size and manufacturing cost of the inverter apparatus can be reduced.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
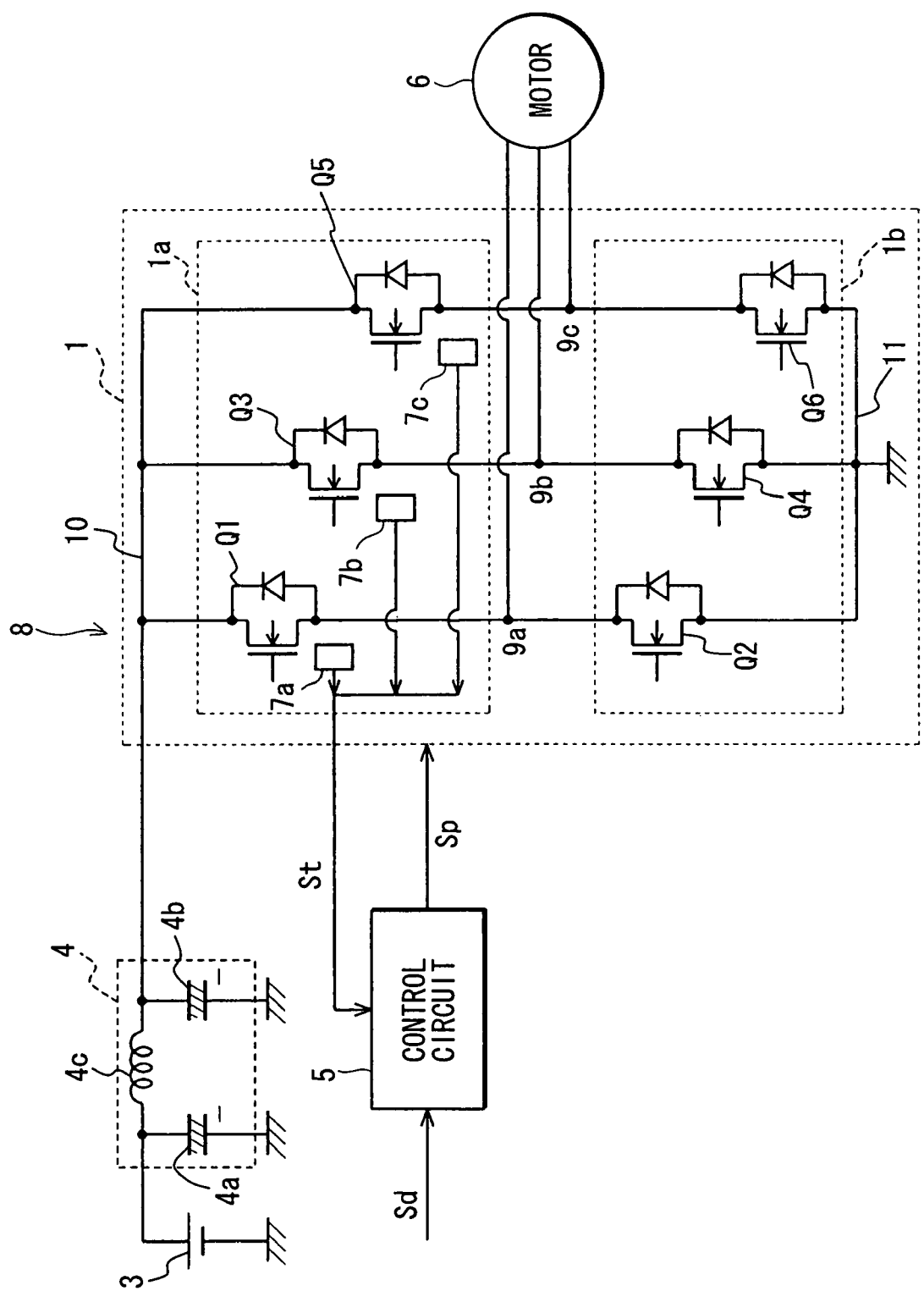
FIG. 1 is a schematic diagram of an inverter apparatus according to an embodiment of the present invention.

As shown in FIG. 1, an inverter apparatus 8 according to an embodiment of the present invention includes a three-phase inverter circuit 1 and a control circuit 5.

The inverter circuit 1 includes three transistor pairs of metal-oxide semiconductor field-effect transistors (MOSFETs) connected in series between power and ground lines 10, 11. The first transistor pair includes MOSFETs Q1, Q2, and a node between the MOSFETs Q1, Q2 provides a phase A output terminal 9a. The second transistor pair includes MOSFETs Q3, Q4, and a node between the MOSFETs Q3, Q4 provides a phase B output terminal 9b. The third transistor pair includes MOSFETs Q5, Q6, and a node between the MOSFETs Q5, Q6 provides a phase C output terminal 9c. Thus, the six MOSFETs Q1-Q6 are connected in a three-phase bridge configuration.

These output terminals 9a-9c of the inverter circuit 1 are connected to respective input terminals of a motor 6. For example, the motor 6 is a three phase brushless DC motor for rotating a radiator fan of a vehicle. The inverter circuit 1 is supplied with direct current (DC) power from a battery 3 through a low pass filter 4. The low pass filter 4 includes capacitors 4a, 4b and an inductor 4c that are connected in a pi-shaped configuration.

The control circuit 5 is a microcomputer and outputs a pulse-width modulated (PWM) signal Sp to gates of the MOSFETs Q1-Q6 in accordance with a drive signal Sd received from an external source.

As shown in FIG. 1, the MOSFETs Q1-Q6 are divided in first and second groups 1a, 1b. The first group 1a includes the MOSFETs Q1, Q3, Q5 that are connected to the power line 10 and the second group 1b includes the MOSFETs Q2, Q4, Q6 that are connected to the ground line 11. The inverter apparatus 8 further includes temperature sensors 7a-7c for detecting temperatures of the MOSFETs Q1, Q3, Q5 of the first group 1a, respectively. Each of the temperature sensors 7a-7c output a temperature detection signal St corresponding to the detected temperature to the control circuit 5. Each detection signal St is sequentially converted to a digital signal by an analog-to-digital (A/D) converter (not shown) and read into the control circuit 5. The control circuit 5 performs an overheat protection for protecting the inverter circuit 1 from overheating, when the detected temperature is equal to or greater than a threshold temperature Tc.

Figure 2:
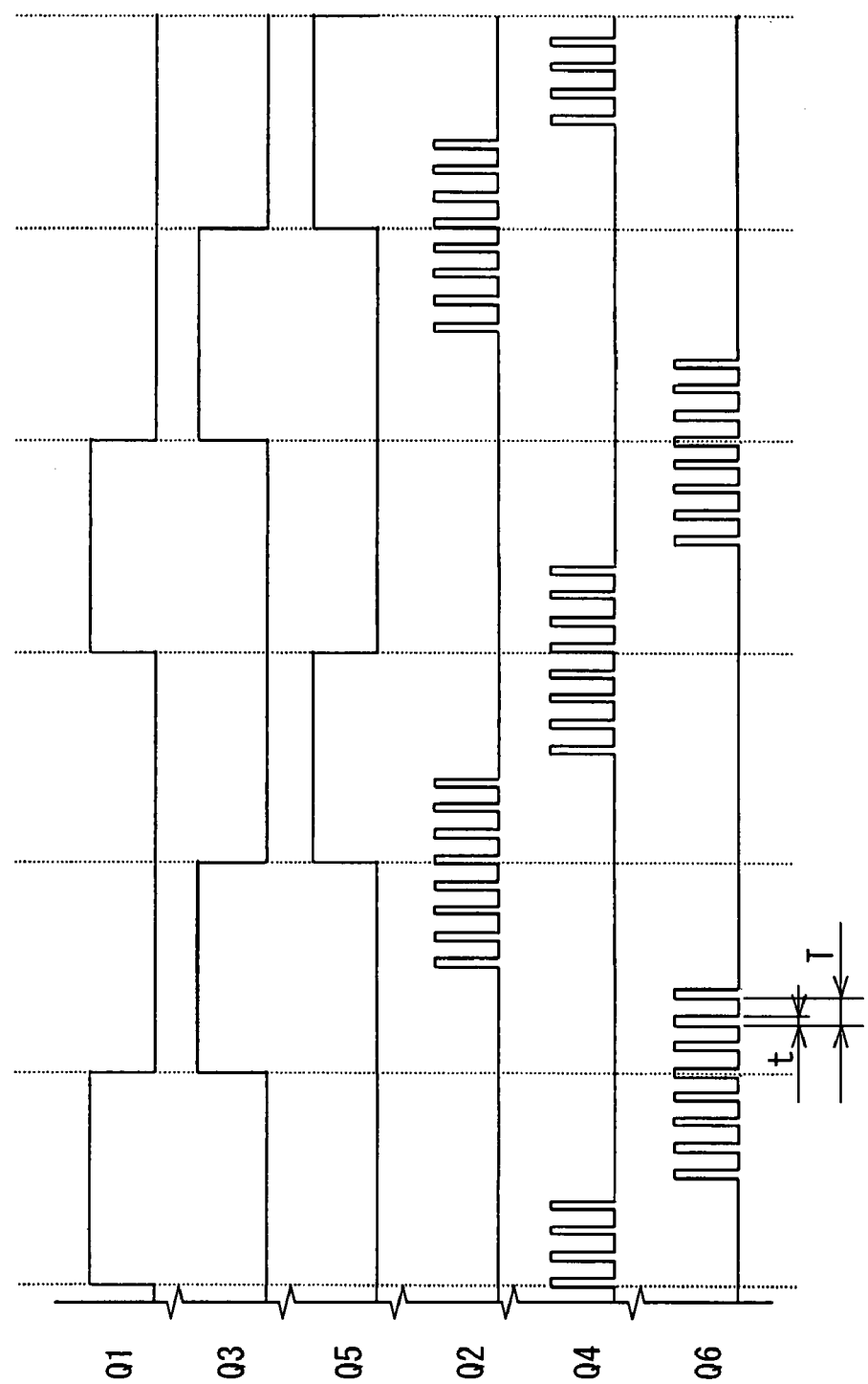
FIG. 2 is a graph illustrating a pulse-width modulated signal applied to an inverter circuit of the inverter apparatus and having a duty cycle of 30%.
Figure 3:
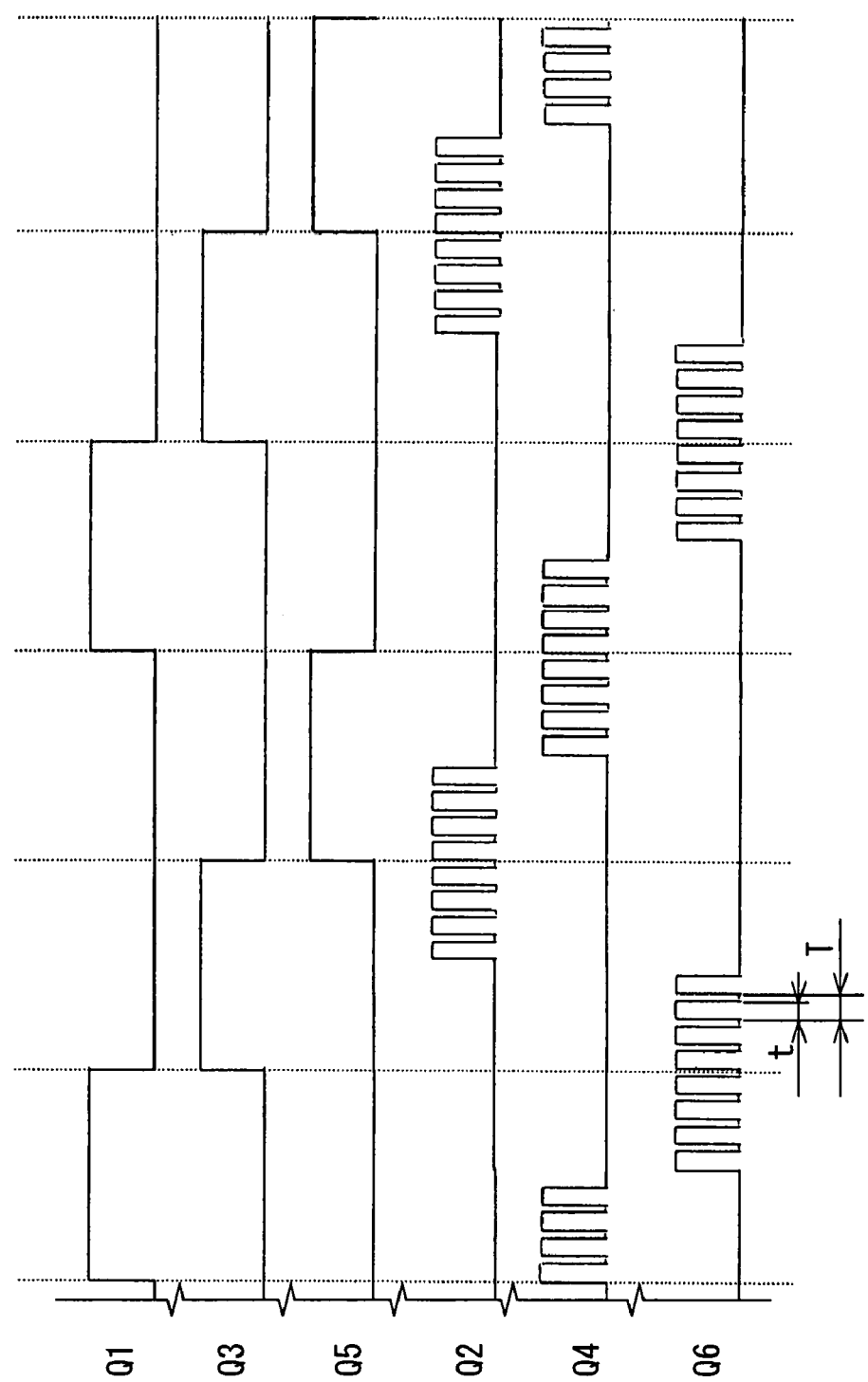
FIG. 3 is a graph illustrating the pulse-width modulated signal applied to the inverter circuit and having the duty cycle of 80%.
Figure 4:
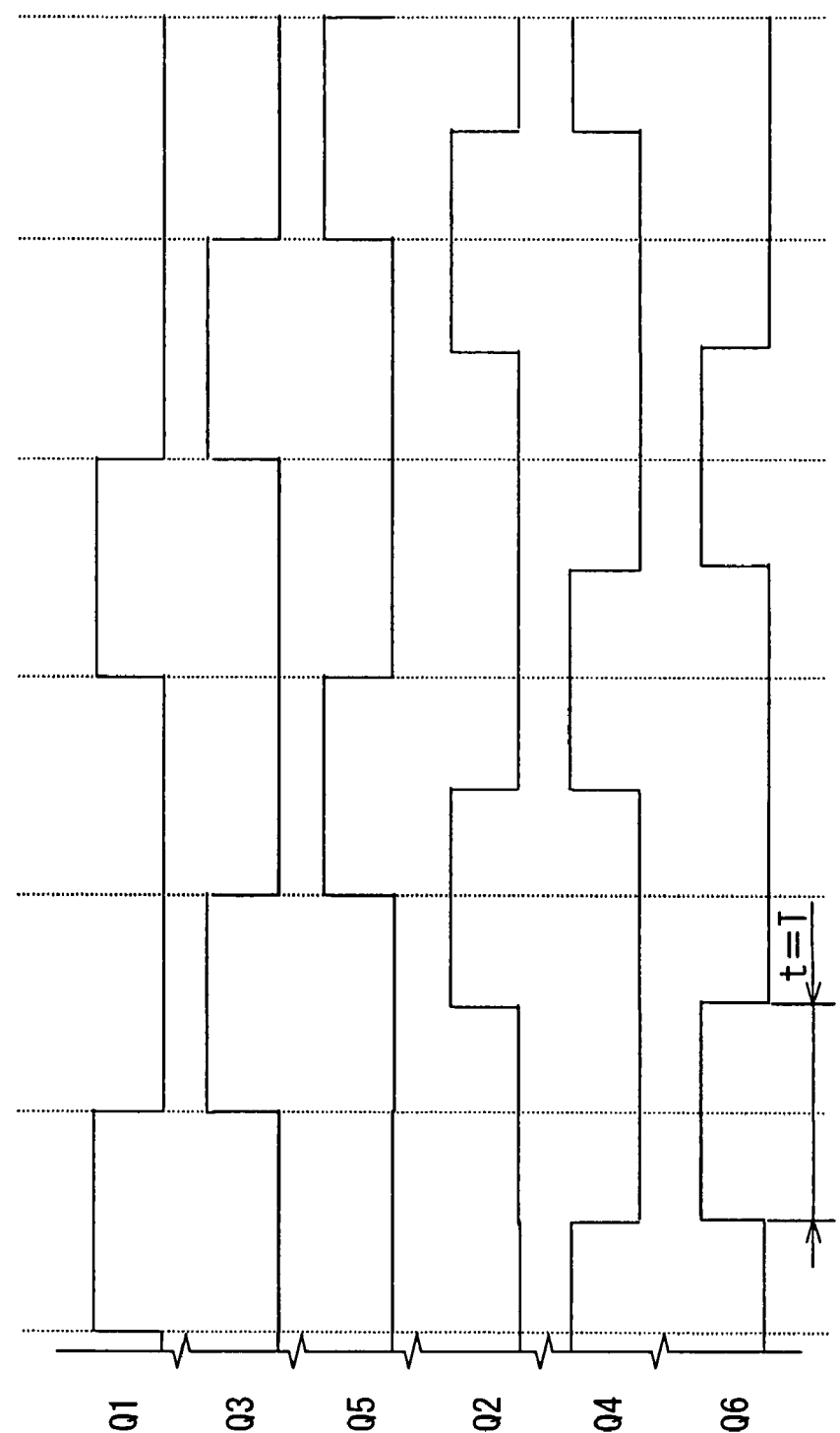
FIG. 4 is a graph illustrating the pulse-width modulated signal applied to the inverter circuit and having the duty cycle of 100%.

FIGS. 2-4 illustrate the PWM signal Sp applied to the gates of the MOSFETs Q1-Q6 of the inverter circuit 1. FIG. 2 shows the case where a duty cycle t/T of the PWM signal Sp is 0.3, i.e., 30%, FIG. 3 shows the case where the duty cycle t/T is 0.8, i.e., 80%, and FIG. 4 shows the case where the duty cycle t/T is 1, i.e., 100%. As can be seen from FIGS. 2-4, magnitude of a voltage applied to the motor 6 is changed by adjusting the duty cycle t/T of the PWM drive signal Sp applied to the gates of the MOSFETs Q2, Q4, Q6 of the second group 1b. In other word, the MOSFETs Q1, Q3, Q5 of the first group 1a are used only to switch between the phases outputs 9a-9c to be energized.

Figure 5:
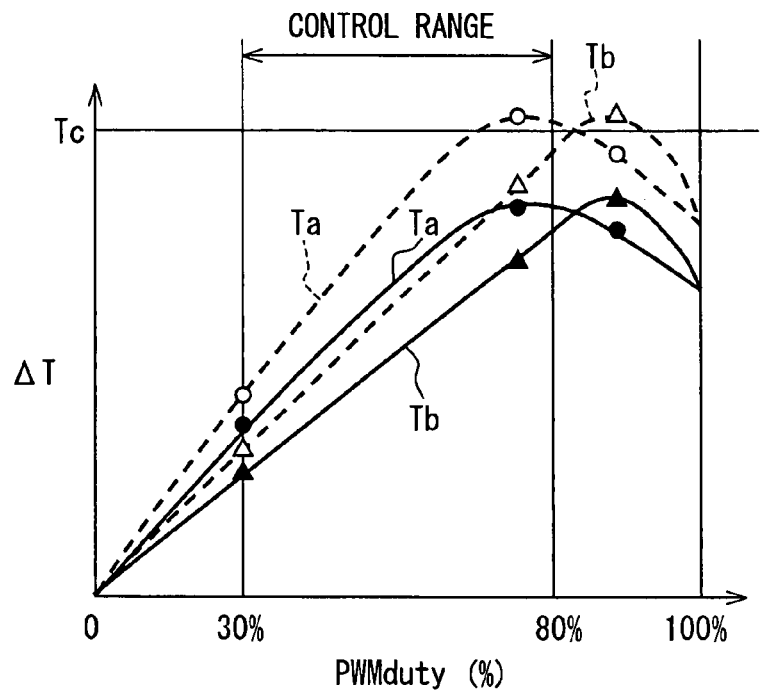
FIG. 5 is a graph showing a relationship between the duty cycle of the pulse-width modulated signal and a temperature of switching elements of the inverter circuit.

FIG. 5 shows relationships between a first temperature Ta of the MOSFETs Q1, Q3, Q5 and the duty cycle t/T and between a second temperature Tb of the MOSFETs Q2, Q4, Q6 and the duty cycle t/T. In FIG. 5, solid lines represent the case where the inverter circuit 1 operates normally and broken lines represent the case where the inverter circuit 1 operates abnormally and overheats.

As shown in FIG. 5, when the duty cycle t/T is between 0% and about 80%, the first temperature Ta is greater than the second temperature Tb. When the duty cycle t/T is between about 80% and 100% exclusive, the first temperature Ta is lower than the second temperature Tb. When the duty cycle t/T is 100%, the second temperature Tb becomes equal to the first temperature Ta due to significant reduction in switching loss.

In practice, if the duty cycle t/T is less than 30%, enough torque to smoothly rotate the motor 6 cannot be produced. Therefore, the drive signal Sd inputted to the control circuit 5 indicates the duty cycle t/T greater than 30%.

The control circuit 5 controls the duty cycle t/T such that the first temperature Ta is equal to or greater than the second temperature Tb. Thus, the control circuit 5 controls the duty cycle t/T such that a first value of heat generated in the first group 1a is equal to or greater than a second value of heat generated in the second group 1b. For example, in the case of FIG. 5, the duty cycle t/T is controlled between 30% and 80%. In such an approach, all the MOSFETs Q1-Q6 can be protected from overheating by detecting only the temperature Ta of the MOSFETs Q1, Q3, Q5 of the first group 1a, i.e., without detecting the temperature Tb of the MOSFETs Q2, Q4, Q6 of the second group 1b.

Figure 6:
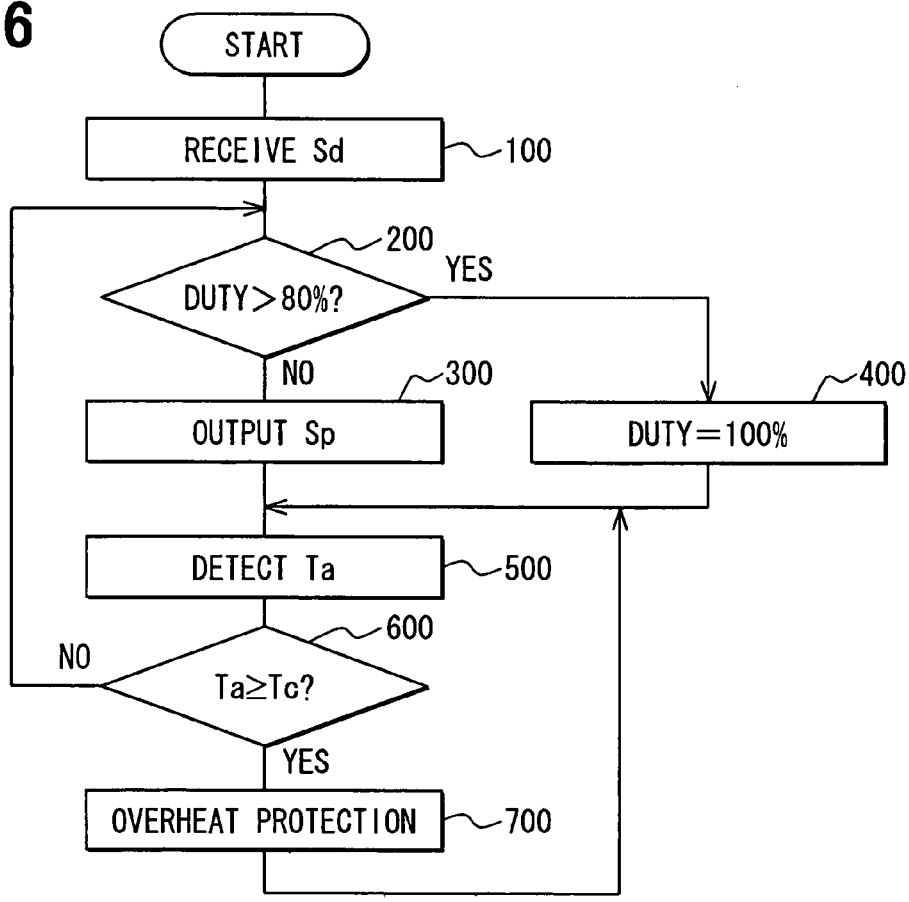
FIG. 6 is a flow diagram showing steps performed by a control circuit of the inverter apparatus.

The control circuit 5 performs a control process shown in FIG. 6. The control process starts at step 100 where the control circuit 5 receives the drive signal Sd and begins to energize the motor 6.

Then, the control process proceeds to step 200 where the control circuit 5 determines whether the duty cycle t/T indicated by the drive signal Sd exceeds 80%. If the duty cycle t/T is equal to or less than 80%, the control process proceeds to step 300 where the control circuit 5 outputs the PWM signal Sp to the inverter circuit 1 without changing the duty cycle t/T. In contrast, if the duty cycle t/T exceeds 80%, the control process proceeds to step 400 where the control circuit 5 sets the duty cycle t/T to 100% and outputs the PWM signal Sp having the duty cycle t/T of 100% to the inverter circuit 1. In such an approach, the control circuit 5 does not output the PWM signal Sp having the duty cycle t/T of between 80% and 100% exclusive. Thus, the first temperature Ta of the MOSFETs Q1, Q3, Q5 can be equal to or greater than the second temperature Tb of the MOSFETs Q2, Q4, Q6.

After step 300 or 400 is finished, the control process proceeds to step 500 where the control circuit 5 detects the first temperature Ta of the MOSFETs Q1, Q3, Q5 based on the detection signal St outputted from the temperature sensors 7a-7c, respectively.

Then the control process proceeds to step 600 where the control circuit 5 determines whether the first temperature Ta exceeds the threshold temperature Tc. If the first temperature Ta is less than the threshold temperature Tc, the control process returns to step 200. In contrast, if the first temperature Ta is equal to or greater than the threshold temperature Tc, the control process proceeds to step 700 where the control circuit 5 performs the overheat protection. When the overheat protection is performed, the control circuit 5 stops the output of the PWM signal Sp to the inverter circuit 1 or reduces the duty cycle t/T to near 30%. The control process repeats steps 500-700 until the first temperature Ta becomes less than the threshold temperature Tc.

According to the embodiment of the present invention, the temperature sensors 7a-7c are provided to the MOSFETs Q1, Q3, Q5 of the first group 1a, respectively. The control circuit 5 controls the duty cycle t/T of the PWM signal Sp such that the first temperature Ta of the MOSFETs Q1, Q3, Q5 is equal to or greater than the second temperature Tb of the MOSFETs Q2, Q4, Q6. Thus, the control circuit 5 controls the duty cycle t/T such that the first value of heat generated in the first group 1a is equal to or greater than the second value of heat generated in the second group 1b.

When the first temperature Ta is equal to or greater than the threshold temperature Tc, the control circuit 5 performs the overheat protection for protecting the inverter circuit 1 from overheating. In such an approach, the inverter circuit 1 can be protected from overheating by detecting only the first temperature Ta, i.e., without detecting the second temperature Tb. Therefore, the number of the temperature sensors can be reduced so that the inverter apparatus 8 can have a reduced size and can be manufactured at a reduced cost.

(Modifications)

The embodiment described above may be modified in various ways. For example, the PWM signal Sp may have the duty cycle of between 0% and 30% as long as the motor 6 can be smoothly rotated by the PWM signal Sp. Various types of switching elements such as insulated-gate bipolar transistors (IGBT) or bipolar transistors can be used instead of the MOSFETs Q1-Q6. The control range of the duty cycle t/T can be determined by experiment. The temperature sensors 7a-7c may be provided to only the second group 1b. In this case, the PWM signal Sp shown in FIGS. 2-4 is replaced between the first and second group 1a, 1b. The first and second group 1a, 1b may be packaged in different chips. In this case, one temperature sensor may be provided to one of the chips. The inverter circuit 1 may be two-phase or four or more-phase inverter circuit. The motor 6 may be a motor other than the fan motor for rotating the radiator fan of the vehicle.

Such changes and modifications are to be understood as being within the scope of the present invention as defined by the appended claims.

What is claimed is:

1. An inverter apparatus comprising:
   an inverter circuit driven by a pulse-width modulated signal and including a plurality of first side switching elements, which form a first group, and a plurality of second side switching elements, which form a second group, each of the plurality of first side switching elements being paired with a corresponding one of the plurality of second side switching elements;

detection means for detecting a temperature of only the first group;

protection means for performing an overheat protection to protect the inverter circuit from overheating when the detected temperature is equal to or greater than a threshold temperature; and control means for outputting the pulse-width modulated signal to the inverter circuit and for controlling a duty cycle of the pulse-width modulated signal such that a first value of heat generated in the first group is equal to or greater than a second value of heat generated in the second group.

2. The inverter apparatus according to claim 1, wherein the protection means reduces the duty cycle of the pulse-width modulated signal when the detected temperature is equal to or greater than the threshold temperature.

3. A method for driving an inverter circuit by a pulse-width modulated signal, the inverter circuit including a plurality of switching elements divided in first and second groups, the driving method comprising:

controlling a duty cycle of the pulse-width modulated signal such that a first value of heat generated in the first group is equal to or greater than a second value of heat generated in the second group;

detecting a temperature of only the first group; and performing an overheat protection for protecting the inverter circuit from overheating when the detected temperature is equal to or greater than a threshold temperature.

4. The method according to claim 3, wherein the performing step reduces the duty cycle of the pulse-width modulated signal.

5. The inverter apparatus according to claim 1, wherein the detection means detects a temperature of at least one of the plurality of first side switching elements of the first group.

6. The inverter apparatus according to claim 5, wherein the detection means detects a temperature of each of the plurality of first side switching elements of the first group.

7. The method according to claim 3, wherein the detecting step detects a temperature of at least one of the switching elements of the first group.

8. The method according to claim 7, wherein the detecting step detects a temperature of each of the switching elements of the first group.

9. The inverter apparatus according to claim 2, wherein the protection means reduces the duty cycle of the pulse-width modulated signal to at or below 30% when, the detected temperature is equal to or greater than the threshold temperature.

10. The method according to claim 4, wherein the performing step includes reducing the duty cycle of the pulse-width modulated signal to at or below 30%.

11. The inverter apparatus according to claim 2, wherein the control circuit is configured such that it will only output the pulse-width modulated signal with either a high duty cycle of 100%, or a reduced duty cycle of 80% or below.

12. The method according to claim 4, wherein the duty cycle of the pulse-width modulated signal is either set at a high duty cycle of 100%, or is set at a reduced duty cycle of 80% or below.

13. The inverter apparatus according to claim 1, wherein the plurality of first side switching elements, which form the first group, includes
a first switching element,
a third switching element, and
a fifth switching element, wherein the plurality of second side switching elements, which form the second group, includes
a second switching element,
a fourth switching element, and
a sixth switching element,
wherein the first and second switching elements are paired,
wherein the third and fourth switching elements are paired, and
wherein the fifth and sixth switching elements are paired.

14. The inverter apparatus according to claim 13, wherein the detection means comprises:
a first temperature sensor for detecting a first temperature of the first switching element;
a third temperature sensor for detecting a third temperature of the third switching element; and
a fifth temperature sensor for detecting a fifth temperature of the fifth switching element,
wherein the protection means determines that the detected temperature is equal to or greater than a threshold temperature when any one of the first temperature. the third temperature, or the fifth temperature are equal to or greater than the threshold temperature.

15. An inverter apparatus comprising:
a control means for outputting a pulse-width modulated signal;
an inverter circuit including
a first plurality of switching elements, and
a second plurality of switching elements;
a detection means for detecting a temperature of only the first plurality of switching elements; and
a protection means for performing an overheat protection operation to prevent the inverter circuit from overheating when the detected temperature is equal to or greater than a threshold temperature,
wherein the first plurality of switching elements and the second plurality of switching elements are equal in number,
wherein each of the plurality of first side switching elements is paired with a corresponding one of the plurality of second side switching elements,
wherein the control means controls a duty cycle of the pulse-width modulated signal such that a first value of heat generated in the first plurality of switching elements is equal to or greater than a second value of heat generated in the second plurality of switching elements.

16. The inverter apparatus according to claim 15, wherein the protection means either stops the output of the pulse-width modulated signal or reduces the duty cycle of the pulse-width modulated signal when the detected temperature is equal to or greater than the threshold temperature.

17. The inverter apparatus according to claim 16, wherein the protection means reduces the duty cycle of the pulse-width modulated signal to at or below 30% when the detected temperature is equal to or greater than the threshold temperature.

18. The inverter apparatus according to claim 16, wherein the control circuit is configured such that it will only output the pulse-width modulated signal with either a high duty cycle of 100%, or a reduced duty cycle of 80% or below.

19. The inverter apparatus according to claim 15,
wherein the plurality of first side switching elements includes
a first switching element,
a third switching element, and
a fifth switching element,
wherein the plurality of second side switching elements includes a second switching element,
a fourth switching element, and
a sixth switching element,
wherein the first and second switching elements are paired,
wherein the third and fourth switching elements are paired, and
wherein the fifth and sixth switching elements are paired.

20. The inverter apparatus according to claim 19, wherein the detection means comprises:
a first temperature sensor for detecting a temperature of the first switching element;
a third temperature sensor for detecting a temperature of the third switching element; and
a fifth temperature sensor fir detecting a temperature of the fifth switching element,
wherein the protection means determines that the detected temperature is equal to or greater than a threshold temperature when any one of the first temperature, the third temperature, or the fifth temperature are equal to or greater than the threshold temperature.

* * * * *